US008762381B2

(12) United States Patent
Betts et al.

(10) Patent No.: US 8,762,381 B2
(45) Date of Patent: Jun. 24, 2014

(54) STORING MULTIPART XML DOCUMENTS (75) Inventors: Christopher Betts, Mount Dandenong (AU); Tony Rogers, Rowville (AU)

(73) Assignee: CA, Inc., Islandia, NY (US)

( * ) Notice: Subject to any disclaimer, the term of this patent is extended or adjusted under 35 U.S.C. 154(b) by 1981 days.

(21) Appl. No.: 11/134,865

(22) Filed: May 19, 2005

(65) Prior Publication Data

US 2005/0267909 A1 Dec. 1, 2005

Related U.S. Application Data (60) Provisional application No. 60/573,513, filed on May 21, 2004.

(51) Int. Cl.
G06F 17/30 (2006.01)

(52) U.S. Cl.
USPC .......................................... 707/741; 707/802

(58) Field of Classification Search
USPC ............ 707/102, 741, 802, 999.102; 715/234
See application file for complete search history.

(56) References Cited

U.S. PATENT DOCUMENTS

| 6,421,656 | B1 * | 7/2002 | Cheng et al. ........................ 707/2 |
| 6,584,459 | B1 * | 6/2003 | Chang et al. ...................... 707/3 |
| 6,681,223 | B1 | 1/2004 | Sundaresan ....................... 707/6 |
| 6,684,222 | B1 * | 1/2004 | Cornelius et al. ............. 707/104.1 |
| 6,804,677 | B2 * | 10/2004 | Shadmon et al. ............. 707/101 |
| 6,976,211 | B2 * | 12/2005 | Lection et al. ................. 715/234 |
| 7,107,282 | B1 * | 9/2006 | Yalamanchi .................. 707/102 |
| 7,127,469 | B2 * | 10/2006 | Lindblad et al. .............. 707/102 |
| 7,313,563 | B2 * | 12/2007 | Bordawekar et al. ......... 707/101 |
| 7,353,222 | B2 * | 4/2008 | Dodds et al. ...................... 707/3 |
| 7,461,074 | B2 * | 12/2008 | Murthy et al. ................. 707/101 |
| 2002/0116371 | A1 * | 8/2002 | Dodds et al. ...................... 707/3 |
| 2002/0133484 | A1 * | 9/2002 | Chau et al. ....................... 707/3 |
| 2002/0143742 | A1 * | 10/2002 | Nonomura et al. .............. 707/1 |
| 2002/0147711 | A1 * | 10/2002 | Hattori et al. .................... 707/3 |
| 2003/0018646 | A1 * | 1/2003 | Ohta et al. .................... 707/100 |
| 2003/0018898 | A1 * | 1/2003 | Lection et al. ................ 713/182 |
| 2003/0033285 | A1 | 2/2003 | Jalali et al. ....................... 707/1 |
| 2003/0101169 | A1 | 5/2003 | Bhatt et al. ....................... 707/3 |
| 2003/0204515 | A1 | 10/2003 | Shadmon et al. ............. 707/100 |
| 2004/0010752 | A1 * | 1/2004 | Chan et al. ..................... 715/513 |
| 2004/0073541 | A1 * | 4/2004 | Lindblad et al. .................. 707/3 |
| 2004/0083209 | A1 * | 4/2004 | Shin ................................ 707/3 |
| 2004/0103105 | A1 * | 5/2004 | Lindblad et al. .............. 707/100 |
| 2004/0148278 | A1 * | 7/2004 | Milo et al. ......................... 707/3 |

(Continued)

FOREIGN PATENT DOCUMENTS

| EP | 1 376 408 A | 1/2004 | ............. G06F 17/30 |
| WO | WO 00/45304 A | 8/2000 | ............. G06F 17/30 |

OTHER PUBLICATIONS

Yoshikawa, Masatoshi, et al., "XRel: A Path-Based Approach to Storage and Retrieval of XML Documents Using Relational Databases", ACM Transactions on Internet Technology, vol. 1, No. 1, Aug. 2001, pp. 110-141.*

(Continued)

Primary Examiner — Robert Stevens
Assistant Examiner — Anil Bhargava
(74) Attorney, Agent, or Firm — Baker Botts, LLP (57) ABSTRACT A method for storing an XML document, the method including decomposing the XML document into a hierarchy of nodes and creating an index of the nodes.

6 Claims, 6 Drawing Sheets

(56) References Cited

U.S. PATENT DOCUMENTS

| | | | | |
|---|---|---|---|---|
| 2004/0205082 A1* | 10/2004 | Fontoura et al. | ............... | 707/101 |
| 2005/0028091 A1* | 2/2005 | Bordawekar et al. | ......... | 715/514 |
| 2005/0160108 A1* | 7/2005 | Charlet et al. | ................ | 707/101 |
| 2005/0160110 A1* | 7/2005 | Charlet et al. | ................ | 707/102 |
| 2006/0101320 A1* | 5/2006 | Dodds et al. | ................... | 715/500 |
| 2008/0040347 A1* | 2/2008 | Potok et al. | ........................ | 707/6 |

OTHER PUBLICATIONS

Schmidt, Albrecht, et al., "Efficient Relational Storage and Retrieval of XML Documents", WEDB, © 2000, pp. 47-52.*

Chan, Chee-Yong, et al., "Efficient Filtering of XML Documents with XPath Expressions", The VLDB Journal, vol. 11, Issue 4, Dec. 2002, pp. 354-379.*

Shimura, Takeyuki, et al., "Storage and Retrieval of XML Documents", Database and Expert System Applications, Springer, © 1999, pp. 206-217.*

Amagasa, Toshiyuki, et al., "Realizing Temporal XML Repositories using Temporal Relational Databases", Cooperative Database Systems for Advanced Applications, Beijing, China, Apr. 23-24, 2001, pp. 60-64.*

Li, Quanzhong, et al., "Indexing and Querying XML Data for Regular Path Expressions", Proc. of the 27th VLDB Conf., Rome, Italy, Sep. 11-14, 2001, pp. 361-370.*

Yao, J. T., et al., "A Fast Tree Pattern Matching Algorithm for XML Query", WI '04, Sydney, Australia, Sep. 20-24, 2004, pp. 1-7.*

Pal, Shankar, et al., "Indexing XML Data Stored in a Relational Database", Proc. of the 30th International Conf. on Very Large Data Bases, Toronto, Canada, Sep. 3, 2004, pp. 1146-1157.*

Laender, Alberto H. F., et al., "A Brief Survey of Web Data Extraction Tools", SIGMOD Record, vol. 31, No. 2, Jun. 2002, pp. 84-93.*

Shen, Yun, et al., "Clustering Schemaless XML Documents", CoopIS/DOA/ODBASE 2003, LNCS 2888, Springer-Verlag, Berlin, Germany, © 2003, pp. 767-784.*

Harold, Elliotte Rusty, XML Bible, 2nd Edition, Hungry Minds, Inc., New York, NY, © 2001, pp. 69-74 and 146-153.*

Microsoft Computer Dictionary, 5th Edition, Microsoft Press, Inc., Redmond, WA, © 2002, pp. 98, 366, 391, 457 and 529.*

McKinnon, Linda, et al., XML in 60 Minutes a Day, Wiley Publishing, Inc., Indianapolis, IN, © 2003, pp. 77-85.*

Seo, Chiyoung, et al., "An Efficient Invert4ed Index Technique for XML Documents using RDBMS", Information and Software Technology, vol. 45, © 2003, pp. 11-22.*

Lee, Mong Li, et al., "Designing Functional Dependencies for XML", EDBT 2002, LNCS 2287, Springer-Verlag, Berlin, Germany, © 2002, pp. 124-141.*

Jiang, Haifeng, et al., "Path Materialization Revisited: An Efficient Storage Model for XML Data", AICE 2000, Canberra, Australia, © 2001, pp. 85-94.*

Al-Khalifa, Shurug, et al., "Structural Joins: A Primitive for Efficient XML Query Pattern Matching", ICDE '02, © 2002, pp. 1-12.*

Amato, Giuseppe, et al., "YAPI: Yet Another Path Index for XML Searching", ECDL 2003, LNCS 2769, Springer-Verlag, Berlin, Germany, © 2003, pp. 176-187.*

Jagadish, H. V., et al., "TIMBER: A Native XML Database", The VLDB Journal, vol. 11, © 2002, pp. 274-291.*

Khan, Latifur, et al., "A Performance Evaluation of Storing XML Data in Relational Database Management Systems", WIDM 2001, Atlanta, GA, © 2001, pp. 31-38.*

Li, Quanzhong, et al., "Indexing and Querying XML Data for Regular Path Expressions", Proc. of the 27th VLDB Conf., Rome, Italy, © 2001, pp. 361-370.*

Shimura, Takeyuki, et al., "Storage and Retrieval of XML Documents Using Object-Relational Databases", DEXA '99, LNCS 1677, Springer-Verlag, Berlin, Germany, © 1999, pp. 206-217.*

Shin, Hyoseop, "On Storing and Querying XML Data within Network-Enabled Embedded Systems", OTM Workshops 2003, LNCS 2889, Springer-Verlag, Berlin, Germany, © 2003, pp. 46-56.*

Tatarinov, Igor, et al., "Storing and Querying Ordered XML Using a Relational Database System", ACM SIGMOD 2002, Madison, WI, Jun. 4-6, 2002, pp. 204-215.*

Yoshikawa, Masatoshi, et al., "XRel: A Path-Based Approach to Storage and Retrieval of XML Documents Using Relational Database", ACM Transactions on Internet Technology, vol. 1, No. 1, Aug. 2001, pp. 110-141.*

Tian, Feng, et al., "The Design and Performance Evaluation of Alternative XML Storage Strategies", ACM SIGMOD Record, vol. 31, Issue 1, Mar. 2002, pp. 5-10.*

Notification of Transmittal of the International Search Report and the Written Opinion of the International Searching Authority for International Application No. PCT/US2005/017979, filed May 19, 2005, (6 pages—2 sided).

S. Legg et al.—The XML Enabled Directory (Roadmap); http://web.archive.org/web/20040220083127/www.xmled.info/docs.php?roadmap, 8 pages, Dec. 19, 2003.

* cited by examiner

Fig. 1

```
<presents>
        <toy name="dragon">
                <color>green</color>
                <type>fluffy</type>
        </toy>
        <toy name="horse">
                <color>blue</color>
                <type>hairy</type>
        </toy>
        <food>chocolate</food>
</presents>
```
\ 11

STORING MULTIPART XML DOCUMENTS

REFERENCE TO RELATED APPLICATION

The present disclosure is based on and claims the benefit of Provisional Application Ser. No. 60/573,513 filed May 21, 2004, the entire contents of which are herein incorporated by reference.

BACKGROUND

1. Technical Field

The present disclosure relates to XML documents and, more specifically, to storing multipart XML documents.

2. Description of the Related Art

Extensible Markup Language (XML) is a popular markup language capable of describing many different types of data, by which software applications can communicate with one another and with human users. XML is a human readable markup language. XML instructions can be read and understood by a human, in contrast to, for example, computer languages that store and send information as binary data.

Because XML is a human readable, platform independent standard, data formulated in XML may be read and interpreted by any computer utilizing any platform, and is easily manipulated and tested by software developers. The ease of use of XML across many different hardware and software environments makes it a popular choice for communication between modern computer software, especially web services based applications. The growing popularity of web services based applications and XML has created a growing demand for new and useful methods to make the programming of web based applications quicker, easier and more efficient. The Apache Cocoon Project (cocoon) is one example of such a system. Cocoon is a web development framework built around the concept of separation of concerns and component-based web development. Cocoon seeks to provide a framework by which a set of components may be programmed where each component provides an isolated function. These components may then be used as building blocks for the development of more complex components and/or complete web services based applications. Using the cocoon framework, users may be able to hook together a series of pre-developed components to form a web based application without needing to engage in the minute details of computer programming. Cocoon also allows users to extract added benefit from programmed components by reusing them in a wide range of web applications without reprogramming what has previously been programmed.

XML document tools have been developed for the storing and searching of data. For example, Lightweight Directory Access Protocol (LDAP) provides for the accessing of on-line directory services. As part of the cocoon framework, a method is provided for the storing and searching of XML document data. Cocoon provides for a database implementation that allows for the manual indexing of particular elements of an XML document, allowing for the XML document to be located during a search. However, cocoon's ability to search for particular subdocuments of an XML document is very limited.

Other methods for searching through XML documents exist. For example, XML documents may be searched through linearly, one after another. However, such a non-indexed search can take a long time, especially in light of the long length of XML documents attributable to their human readable nature.

SUMMARY

A method for storing an XML document, the method including decomposing the XML document into a hierarchy of nodes, and creating an index of the nodes.

A method for searching for an XML document, the method including searching for the XML document using an index that has been created by decomposing one or more XML documents into a hierarchy of nodes.

A system for storing an XML document, includes a decomposing unit for decomposing the XML document into a hierarchy of nodes, and a creating unit for creating an index of the nodes.

A system for searching an XML document, includes a searching unit for searching the XML document using an index that has been created by decomposing one or more XML documents into a hierarchy of nodes.

A computer system includes a processor and a computer recording medium including computer executable code executable by the processor for storing an XML document. The computer executable code includes code for decomposing the XML document into a hierarchy of nodes, and code for creating an index of the nodes.

A computer system includes a processor and a computer recording medium including computer executable code executable by the processor for searching an XML document. The computer executable code includes code for searching the XML document using an index that has been created by decomposing one or more XML documents into a hierarchy of nodes.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

The present disclosure describes a system and method for indexing and searching through stored XML documents and XML sub documents. According to embodiments of the present disclosure, searching through stored XML documents and sub documents may be quick and may minimize processor overhead, for example, it may be computationally efficient. According to embodiments of the present disclosure, search results may be returned as the actual text of the XML document. This may offer advantages, for example, the retrieval of actual XML text may facilitate XML cryptography.

Figure 1:
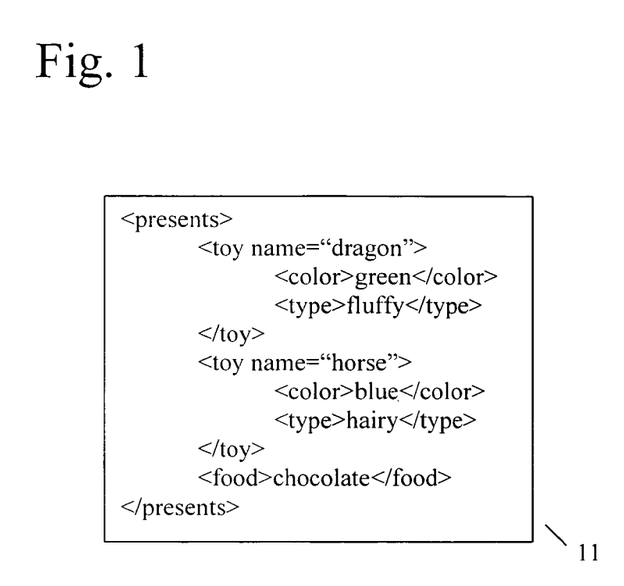
FIG. 1 shows an example of an XML document that may be stored and searched according to an embodiment of the present disclosure.
Figure 5:
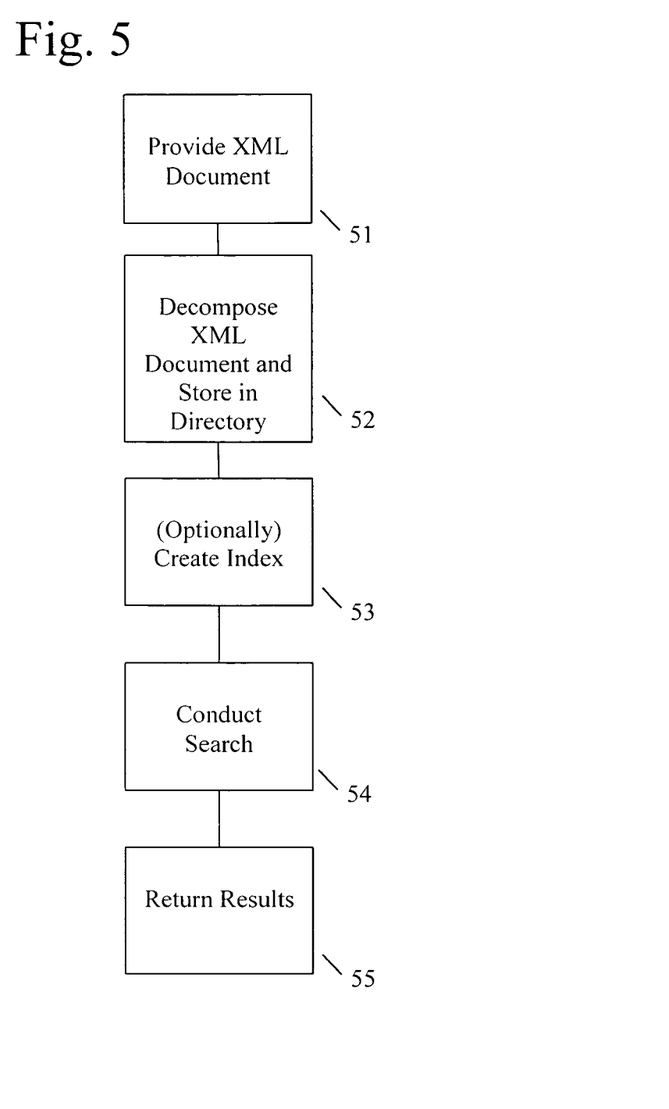
FIG. 5 shows a flowchart illustrating an embodiment of the present disclosure.

FIG. 5 shows a flowchart illustrating an embodiment of the present disclosure. First, an XML document may be provided (Step S51). FIG. 1 shows an example of an XML document 11 that may be provided to be stored and searched according to an embodiment of the present disclosure. The XML document 11 defines "presents" as including a dragon toy that has a green color and a fluffy type, a horse toy that has a green color and a hairy type, and chocolate food. Embodiments of the present disclosure will be described with respect to this example XML document. Of course, the same methods and systems may be applied, more generally, to any XML document or document.

Figure 2:
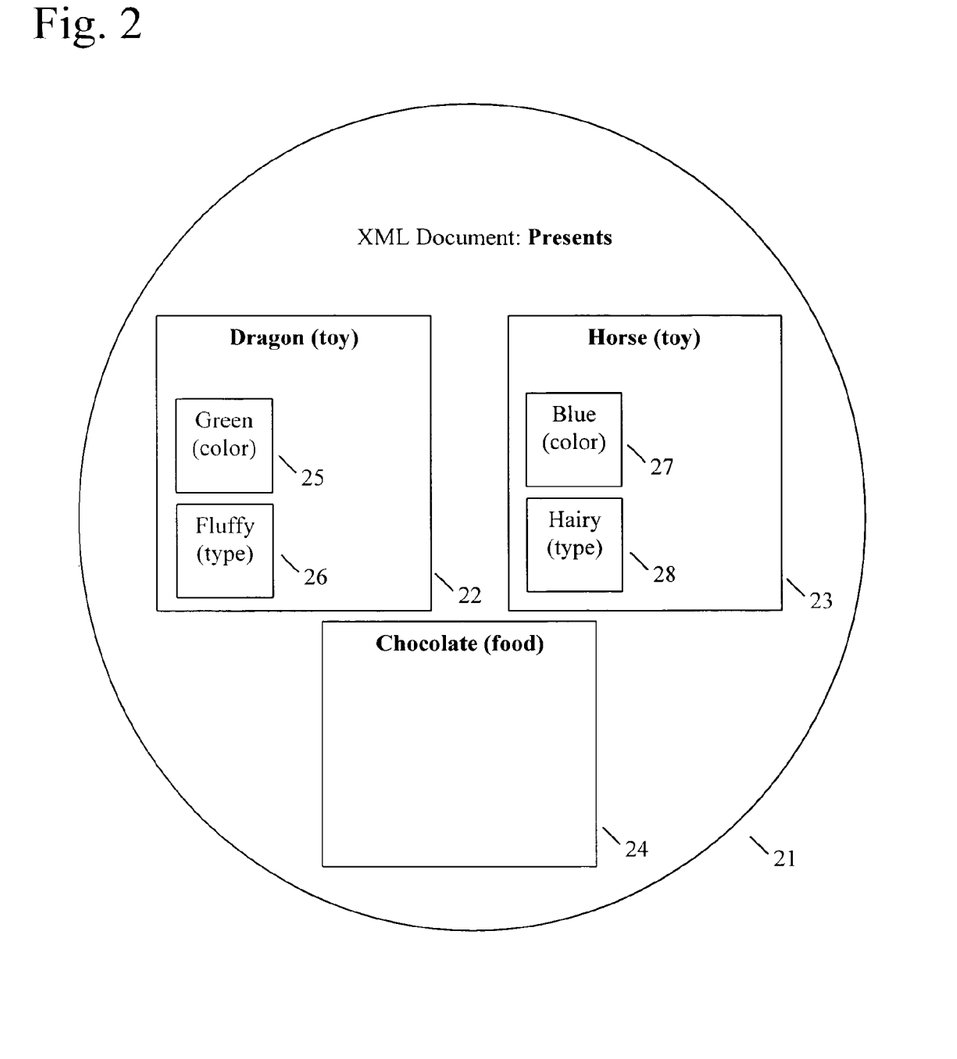
FIG. 2 shows a diagram of how the example XML document that may be stored and searched according to an embodiment of the present disclosure is organized.

FIG. 2 shows a diagram of how the example XML document 11 to be stored and searched according to an embodiment of the present disclosure is organized. The complete XML document 21 defines presents. Within this document 21, three sub documents 22, 23, 24 may be found. A sub document is a portion of a document that may be hierarchically below a document or sub document and/or may be capable of independent function. The first sub document 22 defines a dragon. The dragon sub document 22 is defined as a toy having a green color 25 and a fluffy type 26. The green color 22 and fluffy type 26 are themselves sub documents that define individual characteristics. For example, the green color sub document 25 defines green as a color.

The second sub document 23 defines a horse. The horse sub document 23 is defined as a toy having a blue color 27 and a hairy type 28. The blue color 27 and the hairy type 28 are themselves sub documents that define individual characteristics.

The third sub document 24 defines chocolate. The chocolate sub document 24 is defined as a food but has no sub documents defined within it.

Figure 3:
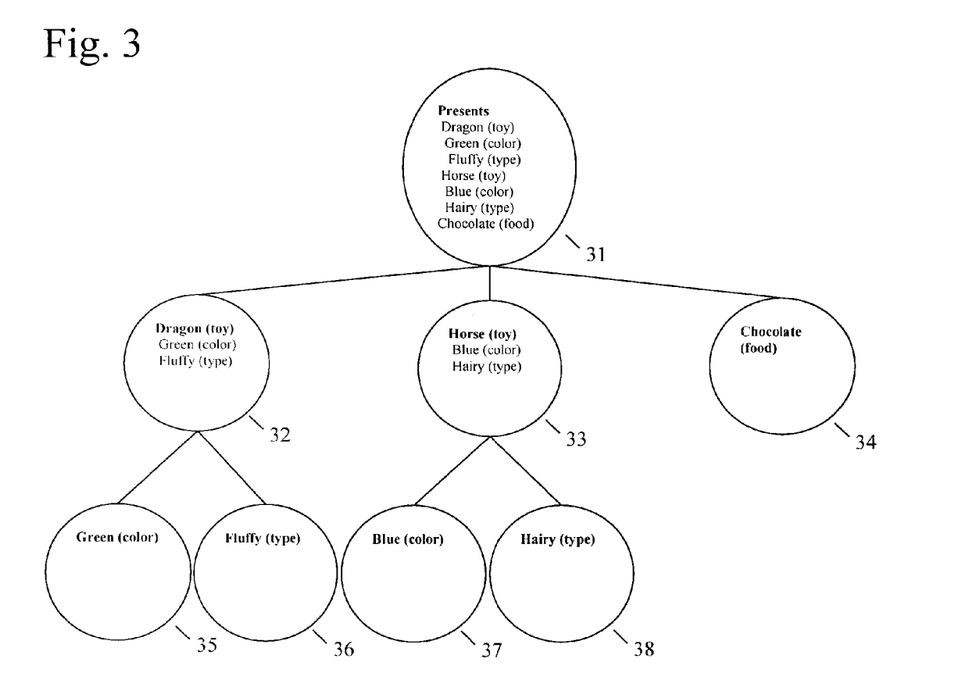
FIG. 3 shows how the example XML document may be decomposed according to an embodiment of the present disclosure.
Figure 4:
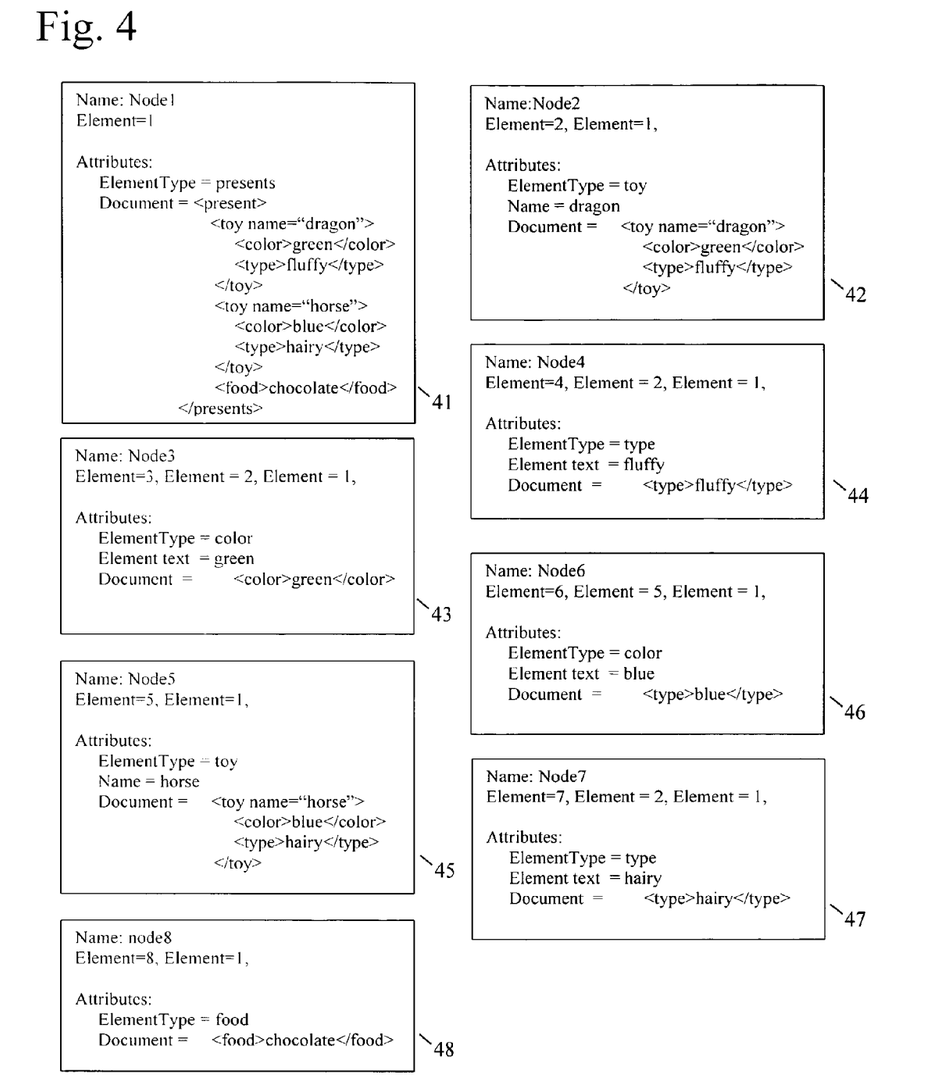
FIG. 4 shows the text of the nodes that the example XML document may be decomposed into according to an embodiment of the present disclosure.

After an XML document has been provided (Step S51), the provided XML document may be decomposed (Step S52). Decomposing an XML document may be the process of dividing the program into discrete units that can be searched. FIG. 3 shows how the example XML document 11 may be decomposed according to an embodiment of the present disclosure. According to an embodiment of the present disclosure, an XML document may be decomposed into one or more nodes. FIG. 4 shows the text of the nodes that the example XML document may be decomposed into according to an embodiment of the present disclosure. These nodes may be hierarchical whereby a parent node may have one or more children nodes. The first node generally represents the entire XML document.

Along with the XML document or sub document text, each node may contain a unique directory identifier. The unique directory identifier may list a node number as well as node numbers for the parent of the node and all other ancestors, where they may exist. Each node may contain a node element name. The node element name may be, for example, a name for the node. This name, for example, may be used to identify the node in an index (directory) that may be created to facilitate searches. Each node may contain one or more node attributes. These attributes may be a list of any characteristics of the node that may facilitate searching for that particular document or sub document. The inclusion of node attributes is an optional feature of the present disclosure and other embodiments of the present disclosure do not use node attributes. Where desired, node attributes may be manually entered by a user or automatically generated by analyzing the text of the document or sub document. Additionally, other values may be stored as part of the node. For example, other values may be stored to facilitate searching.

The first node 31, according to the example XML document 11, represents the entire example XML document 11. The hierarchical position of this node 31 is shown in FIG. 3. The full text 41 of the first node 31 is shown in FIG. 4. In addition to containing the full text of the XML document 11, the first node 31 contains a node element name, here "Node1" and a unique directory identifier, here Element=1. Because only one element is listed as the unique directory identifier, it is clear that this node represents the top of the hierarchy, for example, the full XML document.

Complete XML documents, for example, nodes representing the top of the hierarchy, may list the full XML document as the program text as shown in FIGS. 3 and 4. XML sub documents, for example, nodes that may be in a position other than the top of the hierarchy, for example, children of the complete XML document or children of other sub documents, may list the XML document section that defines that sub document including all sub documents of that sub document, if any should exist, as well as all other sub documents that may be descendents of that sub document.

For example, the second node 32 represents a sub document of the example XML document 11 that defines the toy dragon. The text 42 of the second node 32 is shown in FIG. 4. In addition to including the XML text that defines the dragon as a toy, the text of the second node 32 includes the XML text that defines the color green, which is its self a node 35 and an XML sub document, and the XML text that defines the type fluffy, which is its self a node 36 and an XML sub document.

In addition to including the XML text of the toy dragon sub document, the text 42 of the second node 32, contains a node element name, here "Node2" and a unique directory identifier, here Element=2, Element=1. Because two elements are listed as the unique directory identifier, it is clear that this node is the second node and is a child of the first node on the hierarchy.

Likewise the third node through the eighth node 33-38 all contain the definitions of their particular sub document along with all of the sub documents that may be their respective descendents. The text of these sub documents 43-48 respectively contains the XML text that defines their particular sub document along with all of the sub documents that may be their respective descendents along with their respective node element names and unique identifiers.

After an XML document has been decomposed into nodes representing the XML document and all sub documents as a hierarchy of nodes as described above (Step S52), each node may be stored in a hierarchical directory of XML documents and sub documents. A searchable index may be created to facilitate searching of the directory (Step S53). Each node may be indexed according to its attributes. For example, each node may be indexed according to its XML text, unique directory identifier, node element name, and/or any other attributes that may be listed within each node. For example, each node may be indexed according to its hierarchy.

The storing of the XML document and sub document nodes and the creation of an index may be carried out according to known techniques for storing information to a directory and creating a searchable index. For example, the techniques used for handling LDAP directories may be used to handle the creation of a searchable index.

The above directory may be searched for a particular XML document or sub document (Step S54). To facilitate the search, the created searchable index may be used. After the search has been performed, search results may be returned (Step S55). For example, the full XML text of the documents and/or sub documents resulting from the search may be displayed.

Figure 6:
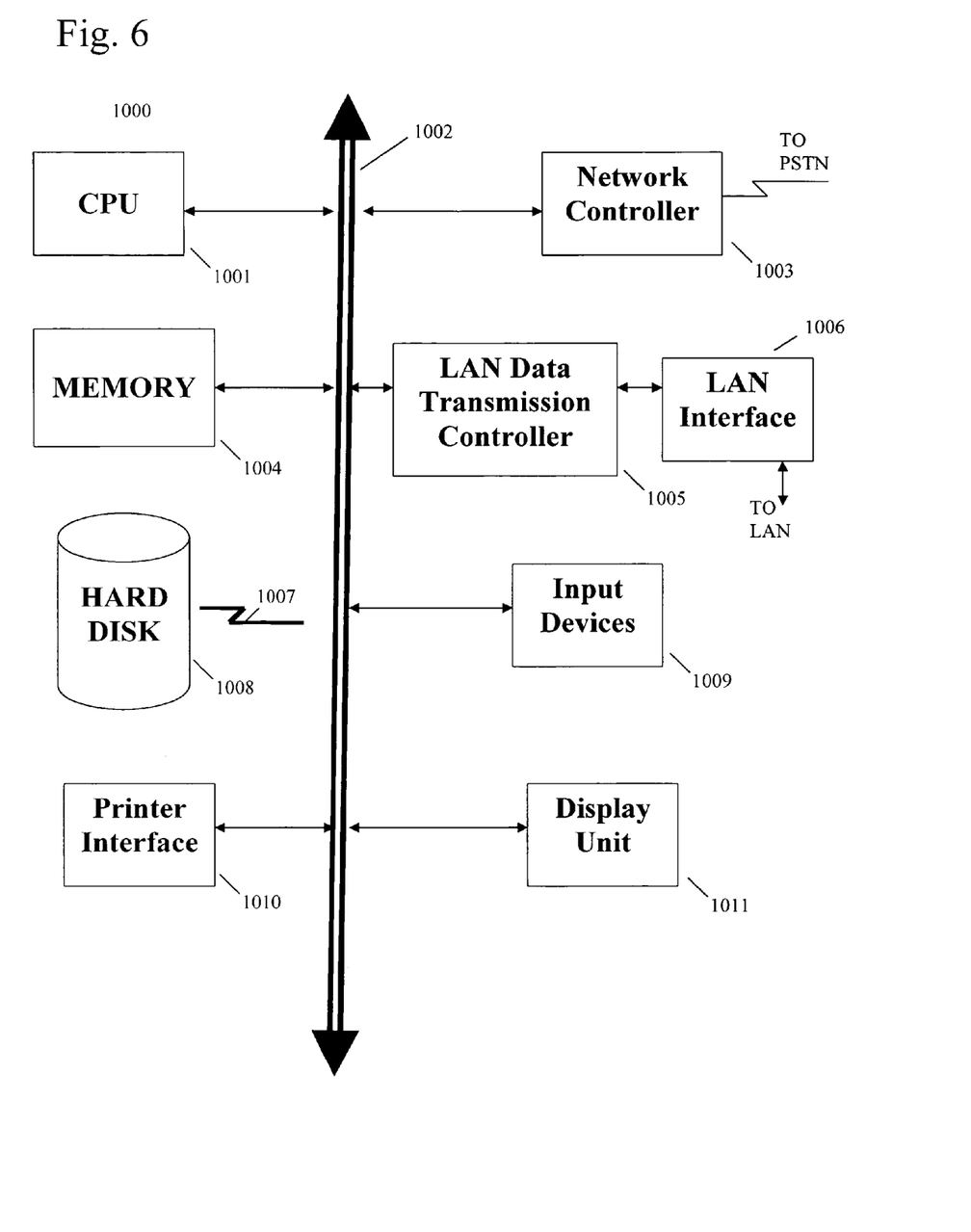
FIG. 6 shows an example of a computer system capable of implementing the method and apparatus according to embodiments of the present disclosure.

FIG. 6 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal buss 1002, and one or more input devices 1009, for example, a keyboard, mouse etc. As shown, the system 1000 may be connected to a data storage device, for example, a hard disk, 1008 via a link 1002.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for storing an XML document, the method comprising:
    establishing a hierarchy of nodes by generating a root node and a plurality of child nodes, the hierarchy of nodes comprising at least three levels of child nodes;
    storing an XML text file in the root node;
    storing a particular section of the XML text file in each of the plurality of child nodes, wherein the particular section of the XML text file stored in each respective child node comprises a subsection of the XML text file stored immediately above the respective child node in the hierarchy of nodes;
    storing a node element name in each of the plurality of child nodes, the node element name corresponding to the particular section of the XML text file stored in each of the plurality of child nodes;
    storing a unique directory identifier in each of the plurality of child nodes, the unique directory identifier corresponding to the node element name stored in each of the plurality of child nodes;
    creating an index of the hierarchy of nodes;
    receiving a search request; and
    returning at least a portion of the XML text file in response to the search request by searching the index.

2. The method of claim 1, wherein each node of the hierarchy of nodes contains one or more node attributes.

3. A system for storing an XML document, comprising:
    a computer recording medium; and
    a processor, the processor operable to execute a program of instructions encoded on the computer recording medium, the program of instructions comprising:
    a decomposing unit operable to:
        establish a hierarchy of nodes by generating a root node and a plurality of child nodes, the hierarchy of nodes comprising at least three levels of child nodes;
        store an XML text file in the root node;
        store a particular section of the XML text file in each of the plurality of child nodes, wherein the particular section of the XML text file stored in each respective child node comprises a subsection of the XML text file stored immediately above the respective child node in the hierarchy of nodes;
        store a node element name in each of the plurality of child nodes, the node element name corresponding to the particular section of the XML text file stored in each of the plurality of child nodes; and
        store a unique directory identifier in each of the plurality of child nodes, the unique directory identifier corresponding to the node element name stored in each of the plurality of child nodes; and
    a creating unit operable to:
        create an index of the hierarchy of nodes;
        receive a search request; and
        return at least a portion of the XML text file in response to the search request by searching the index.

4. The system of claim 3, wherein each node of the hierarchy of nodes contains one or more node attributes.

5. A computer system comprising:
    a processor; and
    a computer recording medium including computer executable code executable by the processor for storing an XML document, the computer executable code comprising:
    code operable to:
        establish a hierarchy of nodes by generating a root node and a plurality of child nodes, the hierarchy of nodes comprising at least three levels of child nodes;
        store an XML text file in the root node;
        store a particular section of the XML text file in each of the plurality of child nodes, wherein the particular section of the XML text file stored in each respective child node comprises a subsection of the XML text file stored immediately above the respective child node in the hierarchy of nodes;
        store a node element name in each of the plurality of child nodes, the node element name corresponding to the particular section of the XML text file stored in each of the plurality of child nodes;
        store a unique directory identifier in each of the plurality of child nodes, the unique directory identifier corresponding to the node element name stored in each of the plurality of child nodes;
        create an index of the hierarchy of nodes;
        receive a search request; and
        return at least a portion of the XML text file in response to the search request by searching the index.

6. The computer system of claim 5, wherein each node of the hierarchy of nodes contains one or more node attributes.

* * * * *